(12) United States Patent
Tanaka

(10) Patent No.: US 10,933,541 B2
(45) Date of Patent: Mar. 2, 2021

(54) ROBOT AND METHOD OF INSTALLING SIGNAL LAMP IN ROBOT

(71) Applicant: FANUC CORPORATION, Yamanashi (JP)

(72) Inventor: Yasuyoshi Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/782,415

(22) Filed: Oct. 12, 2017

(65) Prior Publication Data

US 2018/0104833 A1 Apr. 19, 2018

(30) Foreign Application Priority Data

Oct. 17, 2016 (JP) .............................. JP2016-203744

(51) Int. Cl.
*B25J 19/06* (2006.01)
*B25J 18/00* (2006.01)
(Continued)

(52) U.S. Cl.
CPC .............. *B25J 19/06* (2013.01); *B25J 18/00* (2013.01); *B25J 19/00* (2013.01); *B25J 9/0009* (2013.01); *F21S 8/022* (2013.01); *F21Y 2101/00* (2013.01); *F21Y 2113/13* (2016.08); *F21Y 2115/10* (2016.08)

(58) Field of Classification Search
CPC ... B25J 19/06; B25J 19/00; B25J 18/00; B25J 9/0009; G08B 5/36; F21Y 2115/10; F21Y 2101/00; F21Y 2113/13; F21S 8/022; F21S 6/008; G09F 13/04; G09F 13/0404

USPC ........ 116/200, 202; 362/23.11, 23.12, 23.13, 362/486, 493, 153.1, 362, 363, 89–91, 362/154–156; 200/310, 314, 316, 317
See application file for complete search history.

(56) References Cited

U.S. PATENT DOCUMENTS 1,183,268 A * 5/1916 Baldwin et al. ....... A45C 15/06
  362/156
1,497,728 A * 6/1924 Kresh ........................... 362/133
(Continued)

FOREIGN PATENT DOCUMENTS

CH         701 886       3/2011
CN        104662388      5/2015
(Continued)

OTHER PUBLICATIONS

Notification of Reasons for Refusal dated Mar. 6, 2018 in corresponding Japanese Application No. 2016-203744 (with English translation).
(Continued)

*Primary Examiner* — Nimeshkumar D Patel
*Assistant Examiner* — Tania Courson
(74) *Attorney, Agent, or Firm* — Wenderoth, Lind & Ponack, L.L.P.

(57) ABSTRACT

A robot in which a signal lamp can be installed easily while maintaining the design property of the robot and a method of installing a signal lamp in the robot are provided. A robot includes: a panel that covers an opening of an upper arm; a side wall arranged so as to surround the opening to connect the panel and the upper arm and formed of a light transmitting member; and a signal lamp provided on an inner side of an enclosure formed by the side wall.

11 Claims, 3 Drawing Sheets

(51) Int. Cl.
*F21S 8/02* (2006.01)
*F21Y 113/13* (2016.01)
*F21Y 101/00* (2016.01)
*F21Y 115/10* (2016.01)
*B25J 19/00* (2006.01)
*B25J 9/00* (2006.01)

(56) References Cited

U.S. PATENT DOCUMENTS

| | | | | | |
|---|---|---|---|---|---|
| 1,595,831 | A * | 8/1926 | Gans | | H01H 13/023 200/317 |
| 1,604,857 | A * | 10/1926 | Stein | | H03J 1/044 116/257 |
| 1,864,203 | A * | 6/1932 | MacKenzie | | B60Q 1/36 116/39 |
| 1,934,048 | A * | 11/1933 | Diehl | | A47L 9/30 15/324 |
| 2,232,582 | A * | 2/1941 | Woods | | H03J 5/12 116/263 |
| 2,276,370 | A * | 3/1942 | Alfred | | A45C 15/06 362/156 |
| 2,339,904 | A * | 1/1944 | Almquist | | F24C 7/082 116/310 |
| 2,681,977 | A * | 6/1954 | Ballard | | G01D 11/28 116/286 |
| 2,701,286 | A * | 2/1955 | Slate | | H01H 19/025 200/316 |
| 2,732,467 | A * | 1/1956 | Slate | | G05G 1/105 200/316 |
| 2,740,103 | A * | 3/1956 | Gosswiller | | B60Q 1/2611 340/472 |
| 2,831,453 | A * | 4/1958 | Hardesty | | G01D 11/28 116/288 |
| 3,099,771 | A * | 7/1963 | Matiyak | | H01H 13/023 315/131 |
| 3,170,057 | A * | 2/1965 | Kane | | H01H 13/023 116/DIG. 28 |
| 3,179,777 | A * | 4/1965 | Rohacs | | H01H 13/26 200/317 |
| 3,248,531 | A * | 4/1966 | Dover | | B60Q 1/2615 362/548 |
| 3,407,662 | A * | 10/1968 | Tarbox | | G01F 23/02 116/276 |
| 3,601,567 | A * | 8/1971 | Shah | | H01H 13/023 200/314 |
| 3,626,171 | A * | 12/1971 | Abramowitz | | H01H 13/023 200/314 |
| 3,731,077 | A * | 5/1973 | Reisch | | F21S 8/00 362/615 |
| 3,765,474 | A * | 10/1973 | Burton | | B29C 45/42 164/344 |
| 3,832,506 | A * | 8/1974 | Dewhurst | | H01H 13/023 116/DIG. 28 |
| 4,028,515 | A * | 6/1977 | Desio | | H01H 1/242 200/317 |
| 4,088,855 | A * | 5/1978 | Emery | | H01H 1/242 200/16 A |
| 4,131,033 | A * | 12/1978 | Wright | | G05G 1/02 200/316 |
| 4,350,857 | A * | 9/1982 | Fillus | | H01H 13/83 200/314 |
| 4,404,445 | A * | 9/1983 | Baran | | H01H 3/022 200/314 |
| 4,533,983 | A * | 8/1985 | Hafstad | | F21S 8/033 362/223 |
| 4,607,150 | A * | 8/1986 | Bannister | | B23K 26/0884 219/121.63 |
| 4,758,701 | A * | 7/1988 | Nagel | | H01H 13/023 200/311 |
| 4,954,936 | A * | 9/1990 | Kawabata | | B60Q 1/2657 362/249.01 |
| 5,053,591 | A * | 10/1991 | Theurer | | H01H 23/025 200/302.3 |
| 5,132,887 | A * | 7/1992 | Torii | | B23K 26/0884 219/121.78 |
| 5,252,798 | A * | 10/1993 | Kamada | | H01H 9/182 200/310 |
| 5,264,670 | A * | 11/1993 | Leonard | | H01H 13/023 200/61.62 |
| 5,453,729 | A * | 9/1995 | Chu | | F21S 9/037 340/321 |
| 5,642,933 | A * | 7/1997 | Hitora | | F21S 8/083 362/243 |
| 5,774,098 | A * | 6/1998 | Kawashima | | G09F 9/00 345/83 |
| 5,913,414 | A * | 6/1999 | Pollock | | H01H 19/025 200/316 |
| 5,929,788 | A * | 7/1999 | Vukosic | | B60Q 1/2611 340/471 |
| 6,352,354 | B1 * | 3/2002 | Boillot | | B23K 9/127 219/124.34 |
| 6,448,880 | B2 * | 9/2002 | Yu | | H01H 73/30 200/339 |
| 6,467,921 | B2 * | 10/2002 | Lange | | B60K 37/06 362/23.11 |
| 6,483,439 | B1 * | 11/2002 | Vukosic | | G08B 5/36 340/473 |
| 6,505,098 | B1 * | 1/2003 | Sakamoto | | A63H 3/52 700/215 |
| 6,558,013 | B2 * | 5/2003 | Tholin | | H01H 13/023 116/279 |
| 6,590,174 | B2 * | 7/2003 | Zysnarski | | G05G 1/105 200/310 |
| 6,644,825 | B2 * | 11/2003 | Lin | | B25B 23/18 362/109 |
| 6,726,398 | B2 * | 4/2004 | Hamakawa | | F21S 8/022 404/13 |
| 6,905,228 | B1 * | 6/2005 | Takeyasu | | F21V 5/046 257/432 |
| 7,205,495 | B2 * | 4/2007 | Mazur | | H01H 19/025 200/316 |
| 7,244,898 | B2 * | 7/2007 | Kim | | H01H 13/83 200/314 |
| 7,253,369 | B2 * | 8/2007 | Fu | | H01H 13/83 200/310 |
| 7,331,685 | B2 * | 2/2008 | Shen | | B25C 7/00 362/119 |
| 7,399,098 | B2 * | 7/2008 | Nakamoto | | H01H 19/025 362/23.11 |
| 7,423,886 | B2 * | 9/2008 | Nishimoto | | H01H 19/025 200/314 |
| 7,441,913 | B2 * | 10/2008 | Bayersdorfer | | F16H 59/0278 362/23.11 |
| 7,501,722 | B2 * | 3/2009 | Shitanaka | | G09F 13/04 116/284 |
| 7,763,015 | B2 * | 7/2010 | Cooper | | A61B 90/10 606/1 |
| 7,896,815 | B2 * | 3/2011 | Thrope | | A61B 5/05 600/554 |
| 7,914,167 | B2 * | 3/2011 | Petersen | | B24B 23/005 |
| 8,065,806 | B2 * | 11/2011 | Rainone | | B25B 23/1427 33/1 PT |
| 8,128,258 | B2 * | 3/2012 | Lodhie | | F21V 29/677 362/249.02 |
| 8,168,904 | B2 * | 5/2012 | Huang | | H01H 13/83 200/314 |
| 8,244,191 | B2 * | 8/2012 | Garcia | | H01H 13/023 455/128 |
| 8,497,442 | B2 * | 7/2013 | Gao | | H01H 13/023 200/317 |
| 8,684,572 | B2 * | 4/2014 | Weber | | F21V 19/001 362/507 |
| 8,813,676 | B2 * | 8/2014 | Fuller | | D06F 39/005 116/286 |
| 8,894,634 | B2 * | 11/2014 | Devengenzo | | A61B 34/37 606/1 |
| 9,170,091 | B2 * | 10/2015 | Kiyose | | B25J 13/084 |

(56) References Cited

U.S. PATENT DOCUMENTS

| | | | |
|---|---|---|---|
| 9,336,966 B2* | 5/2016 | Halama | F21V 5/008 |
| 9,375,841 B1 | 6/2016 | Kemper | |
| 9,443,676 B2* | 9/2016 | Na | H01H 19/14 |
| 9,664,887 B2* | 5/2017 | Engel | G01B 21/047 |
| 9,857,039 B2* | 1/2018 | Jagt | F21S 10/005 |
| 9,946,013 B2* | 4/2018 | Yang | F21V 25/12 |
| 9,995,455 B2* | 6/2018 | Di Giovine | F21V 31/005 |
| 10,022,876 B2* | 7/2018 | Kinoshita | B25J 15/0009 |
| 10,065,327 B1* | 9/2018 | Chen | B25J 15/0019 |
| 10,456,931 B2* | 10/2019 | Bordegnoni | B25J 9/0009 |
| 10,601,244 B2* | 3/2020 | Recker | H02J 7/0068 |
| 2003/0031030 A1 | 2/2003 | Simms | B63B 45/04 362/555 |
| 2003/0047128 A1* | 3/2003 | Delp | G01P 13/008 116/276 |
| 2004/0074751 A1* | 4/2004 | Watanabe | H01H 13/023 200/310 |
| 2004/0150991 A1* | 8/2004 | Ouderkirk | H01L 33/46 362/231 |
| 2005/0007784 A1 | 1/2005 | Stein et al. | |
| 2005/0146875 A1* | 7/2005 | Klein | F21S 9/02 362/253 |
| 2005/0194241 A1* | 9/2005 | Kim | H01H 13/83 200/314 |
| 2005/0274593 A1* | 12/2005 | Kawano | H01H 3/12 200/314 |
| 2007/0279923 A1* | 12/2007 | Rodriguez Barros | B60Q 1/2665 362/494 |
| 2008/0000763 A1* | 1/2008 | Cove | H01H 13/023 200/314 |
| 2010/0181174 A1* | 7/2010 | Larson | H01H 19/025 200/310 |
| 2011/0185962 A1* | 8/2011 | Choi | E01F 9/00 116/63 R |
| 2012/0033405 A1* | 2/2012 | Oomori | B25B 23/18 362/89 |
| 2015/0230697 A1* | 8/2015 | Phee | A61B 1/00135 600/106 |
| 2016/0037989 A1* | 2/2016 | Theising | A47L 9/30 15/324 |
| 2016/0109221 A1* | 4/2016 | Takahashi | G01B 11/2545 356/614 |
| 2016/0263752 A1 | 9/2016 | Edsinger | |
| 2017/0182669 A1* | 6/2017 | Bordegnoni | B25J 19/0029 |
| 2017/0215666 A1* | 8/2017 | Won | A47L 9/0488 |
| 2017/0363276 A1* | 12/2017 | Chien | F21V 7/0008 |
| 2018/0133060 A1* | 5/2018 | Patel | F21V 23/0464 |
| 2018/0169872 A1* | 6/2018 | Okamoto | B25J 19/0037 |
| 2019/0187658 A1* | 6/2019 | Fischer | G05B 19/4184 |
| 2019/0325714 A1* | 10/2019 | Rosenberg | G09F 9/375 |
| 2020/0121152 A1* | 4/2020 | Won | B25J 5/007 |

FOREIGN PATENT DOCUMENTS

| | | |
|---|---|---|
| CN | 105380562 | 3/2016 |
| CN | 105619413 | 6/2016 |
| CN | 105916636 | 8/2016 |
| DE | 23 56 609 | 5/1975 |
| DE | 20 2005 012 643 | 12/2005 |
| DE | 601 22 256 | 8/2007 |
| DE | 10 2014 209 525 | 11/2015 |
| DE | 20 2014 010 054 | 3/2016 |
| DE | 10 2015 001 575 | 8/2016 |
| EP | 2 455 053 | 5/2012 |
| JP | 60-42583 | 3/1985 |
| JP | 60-56494 | 4/1985 |
| JP | 61-182793 | 8/1986 |
| JP | 62-58190 | 4/1987 |
| JP | 2003-71761 | 3/2003 |
| JP | 2003-136455 | 5/2003 |
| JP | 2012-218139 | 11/2012 |
| JP | 2013-86223 | 5/2013 |
| JP | 2015-85394 | 5/2015 |
| JP | 2015-93329 | 5/2015 |
| JP | 2015-231651 | 12/2015 |
| JP | 2016-43438 | 4/2016 |

OTHER PUBLICATIONS

Decision to Grant a Patent dated Jul. 10, 2018 in corresponding Japanese Application No. 2016-203744 (with English translation).
Office Action dated Nov. 28, 2018 in corresponding Chinese Patent Application No. 201710948227.2.
Office Action dated Aug. 26, 2019 in German Patent Application No. 102017218183.4.

* cited by examiner

ROBOT AND METHOD OF INSTALLING SIGNAL LAMP IN ROBOT

This application is based on and claims the benefit of priority from Japanese Patent Application No. 2016-203744, filed on 17 Oct. 2016, the content of which is incorporated herein by reference.

BACKGROUND OF THE INVENTION

Field of the Invention

The present invention relates to a robot and a method of installing a signal lamp in the robot.

Related Art

Conventionally, many clients who are delivery destinations for robots have demanded attachment of a signal lamp to the robot indicating the operating state of a robot. Moreover, some safety standards require a signal lamp for displaying the state of a robot. Due to this, some inventions in which a signal lamp or the like is installed in a robot are disclosed (for example, see Patent Documents 1 to 3).

Patent Document 1: Japanese Unexamined Patent Application, Publication No. S60-56494
Patent Document 2: Japanese Unexamined Patent Application, Publication No. S62-58190
Patent Document 3: Japanese Unexamined Patent Application, Publication No. S60-42583

SUMMARY OF THE INVENTION

As illustrated in Patent Documents described above, in many cases, the signal lamp is attached to a panel of a sheet metal or the like. However, when a signal lamp is installed in a robot which is already operating, it is necessary to disable some functions of the panel and to attach the signal lamp to the disabled place. Moreover, there is a demand to maintain the design property of a robot.

The present invention has been made in view of the above-described problems and an object thereof is to provide a robot in which a signal lamp can be installed easily while maintaining the design property of the robot and a method of installing a signal lamp in the robot.

(1) A robot (for example, a robot 1 to be described later) of the present invention includes: a lid portion (for example, a panel 30 to be described later) that covers an opening (for example, an opening 20a to be described later) of a machine body (for example, an upper arm 20 to be described later) of the robot; a side wall (for example, a side wall 42 to be described later) arranged so as to surround the opening to connect the lid portion and the machine body and formed of a light transmitting member; and a light emitting unit (for example, a signal lamp 50 to be described later) provided on an inner side of an enclosure formed by the side wall.

(2) In the robot according to (1), the side wall may be bonded to the lid portion and the machine body by an elastic sealing member (for example, a gasket 41 to be described later).

(3) The robot according to (1) or (2) may further include an extension member (for example, a stay 43 to be described later) that extends toward an inner side from the side wall, the light emitting unit is fixed by the extension member, and the side wall and the extension member are integrated with each other.

(4) In the robot according to any one of (1) to (3), the lid portion may be a connection panel.

(5) In the robot according to any one of (1) to (4), the side wall is a diffusion plate for diffusing light from the light emitting unit.

(6) A method of installing a signal lamp in a robot according to the present invention includes: removing a lid portion (for example, a panel 30 to be described later) that covers an opening (for example, an opening 20a to be described later) of a machine body (for example, an upper arm 20 to be described later) of a robot (for example, a robot 1 to be described later); providing a signal lamp (for example, a signal lamp 50 to be described later) in the opening; and arranging a side wall (for example, a side wall 42 to be described later) formed of a light transmitting member that transmits light emitted by the signal lamp so as to surround the opening to connect the lid portion and the machine body of the robot.

According to the present invention, it is possible to provide a robot in which a signal lamp can be installed easily while maintaining the design property of the robot and a method of installing a signal lamp in the robot.

DETAILED DESCRIPTION OF THE INVENTION

Hereinafter, an embodiment of the present invention will be described with reference to the drawings. This is an example only and the technical scope of the present invention is not limited to this.

Embodiment

Figure 1:
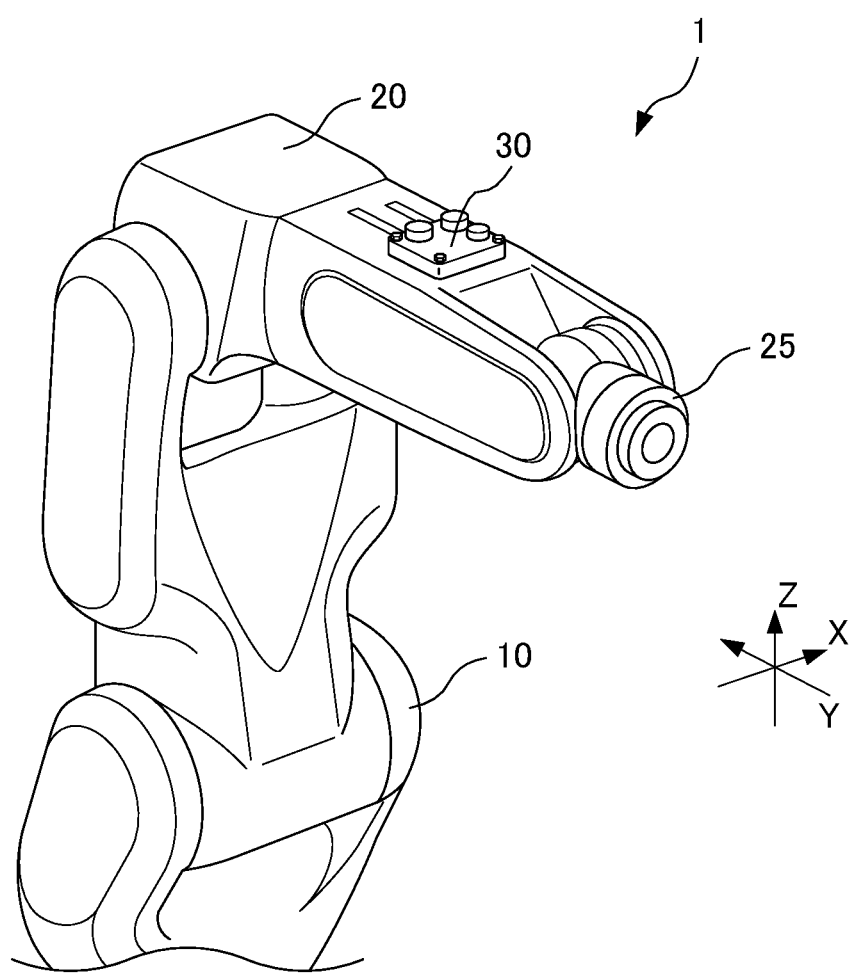
FIG. 1 is a perspective view of a robot according to the present embodiment.

FIG. 1 is a perspective view of a robot 1 according to the present embodiment. The robot 1 illustrated in FIG. 1 is a robot that enables a cooperative operation of performing operations simultaneously in the same working space as a human while securing the safety of a human, for example. The robot 1 includes a lower arm 10 on a base (not illustrated). Moreover, the robot 1 includes an upper arm 20 (a machine body) that is rotatably supported on the lower arm 10. In this example, although it is described that the robot 1 includes the lower arm 10 and the upper arm 20, the robot may have other existing structures. Moreover, the robot 1 has a controller (not illustrated) that controls an operation of the robot 1.

An opening 20a to be described later is formed in the upper arm 20, and the opening 20a is blocked by a panel 30 (a lid portion) or the like. The inside of the upper arm 20 is a cavity in which cables connected to a hand 25 provided at the distal end of the upper arm 20, and wires of a connector 31 provided in the panel 30, and the like are accommodated. The opening 20a is used when an operation is performed by removing the panel 30 when changing wiring or the like of a cable for operating the upper arm 20, for example.

Figure 2:
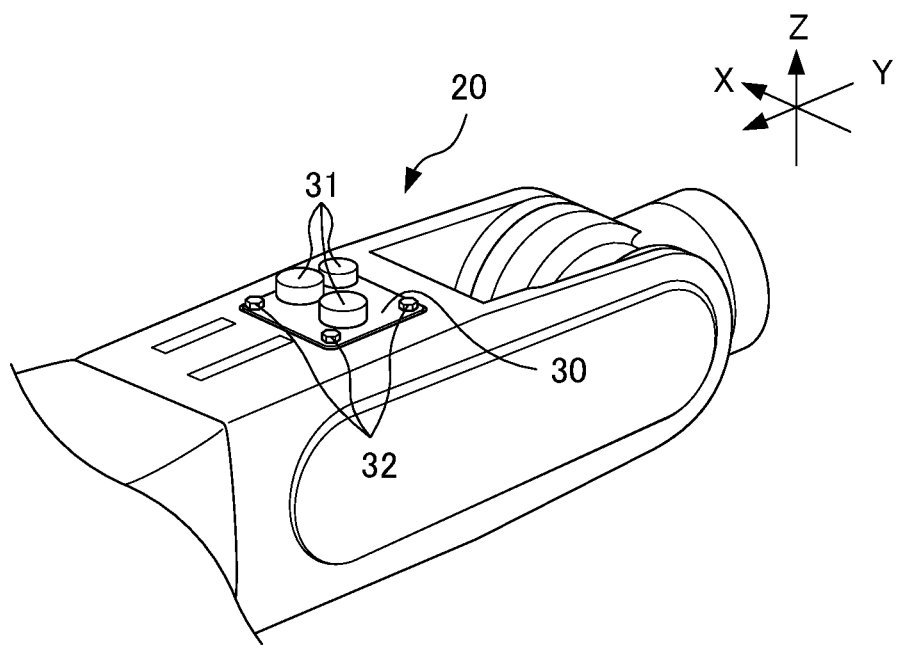
FIG. 2 is a perspective view of the surrounding of a panel before installation.
Figure 3:
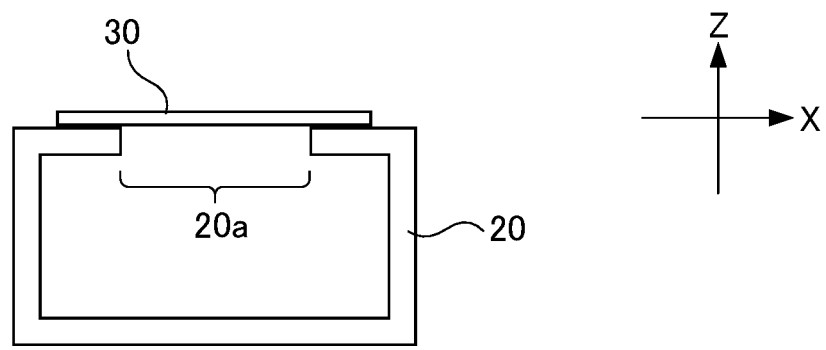
FIG. 3 is a cross-sectional view of an upper arm including the panel before installation.

Here, the structure of the upper arm 20 to which the panel 30 before installation of a signal lamp 50 to be described later, is attached (a light emitting unit, see FIG. 5), will be described. FIG. 2 is a perspective view of the surrounding of the panel 30 before installation. FIG. 3 is a cross-sectional view of the upper arm 20 including the panel 30 before installation. As illustrated in FIGS. 2 and 3, the panel 30 of the robot 1 before installation of the signal lamp 50 is disposed to block the opening 20a. The opening 20a is a hole having a square shape of which the lengths in a width direction X and a depth direction Y are approximately 40 mm to 50 mm each, for example.

The panel 30 is a member for blocking the opening 20a. The panel 30 is a sheet metal having a square shape of which the size is approximately several mm to several tens of mm larger than the size of the opening 20a. The thickness of the panel 30 in a height direction Z is approximately several mm. The panel 30 is a connection panel and has a plurality of connectors 31. The size of the opening 20a and the panel 30 is an example and is not limited to this. The connector 31 is used for various operations performed by the robot 1. Moreover, the panel 30 has four screws 32. The screw 32 and the panel 30, are a latch for stopping the upper arm 20. The screw 32 is provided near the four corners of the panel 30. A gasket (not illustrated) is provided between the panel 30 and the upper arm 20.

Here, in the past, when one wanted to attach the signal lamp 50 to the robot 1, the signal lamp 50 was attached to the panel 30, for example. In such a case, it is necessary to remove one of the plurality of connectors 31 disposed in the panel 30 and attach the signal lamp 50 to the removal position. Therefore, when the above-described installation method is employed, it is necessary to change the wiring of the connector 31. Moreover, a form that the signal lamp 50 projects from the upper arm 20 is created, and the appearance of the robot 1 changes.

Figure 4:
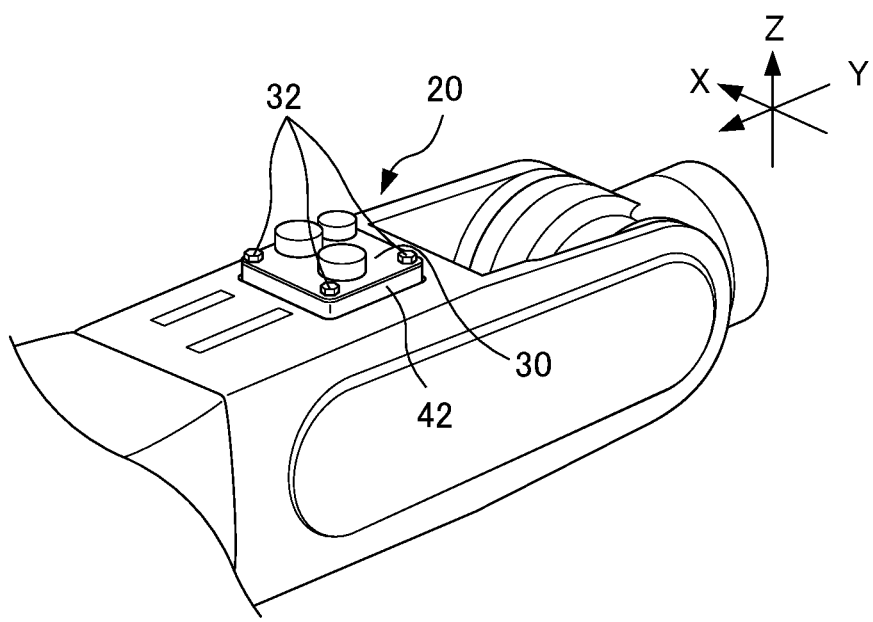
FIG. 4 is a perspective view of the surrounding of the panel of the robot according to the present embodiment.
Figure 5:
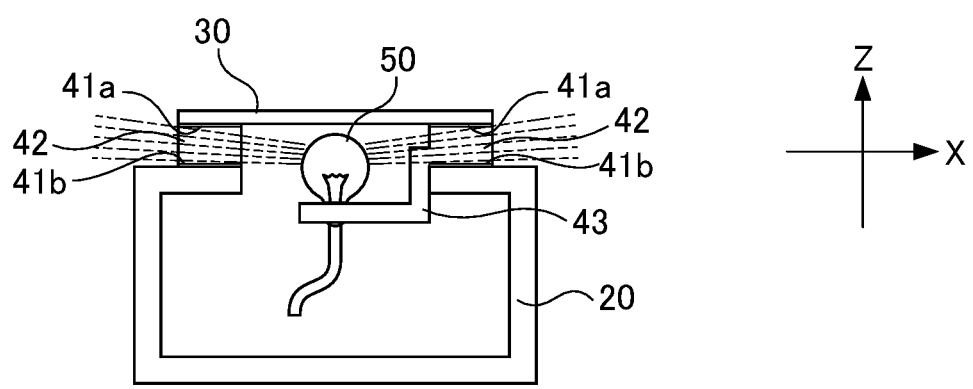
FIG. 5 is a cross-sectional view of the upper arm including the panel of the robot according to the present embodiment.

Next, the structure of the upper arm 20 in which the signal lamp 50 is installed will be described. FIG. 4 is a perspective view of the surrounding of the panel 30 of the robot 1 according to the present embodiment. FIG. 5 is a cross-sectional view of the upper arm 20 including the panel 30 of the robot 1 according to the present embodiment. As illustrated in FIGS. 4 and 5, the robot 1 after the signal lamp 50 is installed has side walls 42 provided between the panel 30 and the upper arm 20. The side walls 42 are provided to surround the opening 20a. The side wall 42 and the panel 30 block the opening 20a.

The side wall 42 is a light transmitting diffusion plate formed of a resin plate of acryl, vinyl chloride, polycarbonate, and the like, for example. The side wall 42 diffuses light of the signal lamp 50 to the outside. The side wall 42 may not be the light transmitting diffusion plate but may be a glass plate, for example. However, the side wall 42 is preferably formed of a resin from the perspective of weight, safety, mass productivity, and moldability. The length of the side wall 42 in the height direction Z is approximately 10 mm. The length in the height direction Z is set such that the appearance of the robot 1 is not impaired and the light of the signal lamp 50 generated therein does not leak outside. The dimension in the height direction Z of the side wall 42 is an example and is not limited to this.

The side wall 42 is bonded to the panel 30 by a gasket 41a. Moreover, the side wall 42 is bonded to the upper arm 20 by a gasket 41b. The gasket 41 (41a, 41b) is a resin member. One of the gaskets 41a and 41b for bonding the side wall 42 may use the gasket that bonds the panel 30 and the upper arm 20. Another member other than the gasket 41 may be used for bonding the side wall 42 as long as the member is a sealing member having an appropriate elasticity.

A stay 43 (an extension member) that extends from the side wall 42 toward the cavity of the upper arm 20 via the opening 20a is provided in one side surface of the side wall 42. The stay 43 is formed of a resin of the same material as the side wall 42. Moreover, the stay 43 is a member for fixing the signal lamp 50. The signal lamp 50 is a light emitting device and uses a light emitting diode (LED), for example. The signal lamp 50 may output white light by the light emission. Moreover, the signal lamp 50 may output colored light such as red, yellow, or blue by the light emission.

Next, a method of installing the signal lamp 50 in the robot 1 having the panel 30 illustrated in FIGS. 2 and 3 to provide such a robot 1 as illustrated in FIGS. 4 and 5 will be described.

(1) The screws 32 are loosened to separate the panel 30 from the upper arm 20.

(2) The side wall 42 in which the stay 43 is provided on one side surface is provided in an upper portion of the gasket 41b so as to surround the opening 20a so that the stay 43 is on the inner side.

(3) The signal lamp 50 is fixed to the stay 43. In this case, wiring of the signal lamp 50 is performed using the opening 20a.

(4) The gasket 41a is provided in an upper portion of the side wall 42.

(5) The panel 30 is provided in an upper portion of the gasket 41a and the screws 32 are fastened and fixed.

The signal lamp 50 is turned on, for example, when the robot 1 is in a cooperation mode where the robot can perform operations together with a human or when the power of the robot 1 is ON and electricity is supplied to the robot 1. Moreover, a color may be set to each of a plurality of modes so that a present mode can be identified by the color of light emitted from the signal lamp 50.

As described above, the robot 1 of the present embodiment provides the following advantageous effects.

(1) Since the light transmitting side walls 42 are provided between the panel 30 and the upper arm 20 so as to surround the opening 20a and the signal lamp 50 is provided therein, it is possible to output light of the signal lamp 50 to the outside without impairing the appearance of the robot 1. Therefore, it is possible to provide the robot 1 which maintains its stylish appearance without changing the design of the appearance. Moreover, since the panel 30 is used as it is, it is possible to use the existing connectors 31 provided in the panel 30 without processing the panel 30.

(2) It is possible to install the signal lamp 50 easily by lifting the panel 30 and providing the light transmitting side walls 42 so as to cover the opening 20a.

(3) Since the side walls 42 are bonded by the gasket 41, waterproofness is obtained. Therefore, the signal lamp 50 provided therein may not have waterproofness.

(4) Since the stay 43 is provided in the side walls 42, it is possible to fix the signal lamp 50 on the inner side of the side walls 42. Moreover, since the side walls 42 and the stay 43 are integrally formed of the same resin having light transmitting properties, the stay 43 is not visible from the outside and light is not blocked by the stay 43.

While the embodiment of the present invention has been described, the present invention is not limited to the above-described embodiment. The advantageous effects described in the embodiment are only examples of most preferable effects produced by the present invention, and the advantageous effects of the present invention are therefore not limited to those described in the embodiment. The above-described embodiment and modifications to be described later may be used in appropriate combinations, and the detailed description thereof will be omitted.

(Modification)

(1) While an example in which connectors are provided in the panel has been described in the embodiment, the present invention is not limited to this. For example, another member other than the connectors may be provided in the panel, or nothing may be provided in the panel. Moreover, the panel itself may be formed of a member that transmits light. When the member has light transmitting properties, light of the signal lamp can be clearly observed from the outside.

(2) While an example in which the side wall and the stay are formed of resins of the same material has been described in the present embodiment, the present invention is not limited to this. The side wall and the stay may not be integrated as long as a structure that enables the signal lamp to be fixed and installed is provided. Moreover, the stay may be formed of a material different from that of the side wall.

(3) While an example in which the opening has a square shape has been described in the present embodiment, the present invention is not limited to this. For example, the opening may have a circular shape, an elliptical shape, or a rectangular shape.

(4) While an example in which the side wall is formed of a light transmitting member has been described in the present embodiment, the present invention is not limited to this. At least a portion of the side wall may be formed of a light transmitting member so as to diffuse light emitted by the signal lamp.

(5) While an LED is used as an example of the signal lamp in the present embodiment, the present invention is not limited to this. The signal lamp may be another light emitting device such as an incandescent bulb or a fluorescent lamp. However, the LED is preferred when durability is taken into consideration. Moreover, while an example in which one signal lamp is installed has been described in the present embodiment, the present invention is not limited to this. For example, a plurality of signal lamps that emit light of different colors such as red, yellow, and blue may be installed.

EXPLANATION OF REFERENCE NUMERALS

1: Robot
20: Upper arm
20a: Opening
30: Panel
41: Gasket
42: Side wall
43: Stay
50: Signal lamp

What is claimed is:

1. An industrial robot comprising:
a lid portion that is removable, covers an opening of a surface of the industrial robot, and is provided with one or more connectors arranged on a top surface thereof;
a side wall provided separately from the lid portion and the surface of the industrial robot, and arranged so as to surround the opening so that the side wall connects the lid portion to the surface of the industrial robot, the side wall being formed of a light transmitting member; and
a light emitting unit provided separately from the lid portion and arranged on an inner side of an enclosure formed by the side wall.

2. The industrial robot according to claim 1, wherein the side wall is bonded to the lid portion and the surface of the industrial robot by an elastic sealing member.

3. The industrial robot according to claim 1, further comprising:
an extension member that extends toward an inner side from the side wall, the extension member being arranged so as to be substantially parallel to the lid portion, wherein
the light emitting unit is fixed by the extension member, and
the side wall and the extension member are integrated with each other.

4. The industrial robot according to claim 1, wherein the lid portion is a connection panel having the one or more connectors, and
the one or more connectors are used for operations performed by the industrial robot.

5. The industrial robot according to claim 1, wherein the side wall is a diffusion plate for diffusing light from the light emitting unit.

6. The industrial robot according to claim 1, wherein the industrial robot is configured to set a plurality of modes corresponding to a plurality of operation states, respectively, and
the light emitting unit of the industrial robot is configured to emit light in different colors, the light being emitted in a color corresponding to the mode thus set.

7. The industrial robot according to claim 1, wherein the light emitting unit arranged on the inner side of the enclosure is one of a plurality of light emitting units arranged on the inner side of the enclosure,
the industrial robot is configured to set a plurality of modes corresponding to a plurality of operation states, respectively, and
each of the plurality of light emitting units of the industrial robot is configured to emit light in a different color, the light being emitted in a color corresponding to the mode thus set.

8. A method of installing a signal lamp in an industrial robot, comprising:
removing a lid portion that covers an opening of a surface of the industrial robot and that is provided with one or more connectors arranged on a top surface thereof;
providing the signal lamp in the opening, the signal lamp being provided separately from the lid portion; and
arranging a side wall formed of a light transmitting member that transmits light emitted by the signal lamp so as to surround the opening so that the side wall connects the lid portion to the surface of the industrial robot, the side wall being provided separately from the lid portion and the surface of the industrial robot.

9. The method of installing a signal lamp in an industrial robot according to claim 8, further comprising:
providing an extension member that extends toward an inner side from the side wall, the extension member being arranged so as to be substantially parallel to the lid portion, wherein
the signal lamp is fixed by the extension member, and
the side wall and the extension member are integrated with each other.

10. A method of installing a signal lamp in an industrial robot, comprising:

removing a lid portion that is in direct contact with a top surface of the industrial robot, covers an opening of a surface of the industrial robot, and is provided with one or more connectors arranged on a top surface thereof;

providing the signal lamp in the opening, the signal lamp being provided separately from the lid portion; and arranging a side wall formed of a light transmitting member that transmits light emitted by the signal lamp so as to surround the opening so that (i) a bottom surface of the side wall is in direct contact with the top surface of the industrial robot, and (ii) a top surface of the side wall is in direct contact with the lid portion, such that the lid portion is connected to the surface of the industrial robot via the side wall, wherein the side wall is provided separately from the lid portion and the surface of the industrial robot.

11. The method of installing a signal lamp in an industrial robot according to claim 10, further comprising:

providing an extension member that extends toward an inner side from the side wall, the extension member being arranged so as to be substantially parallel to the lid portion, wherein the signal lamp is fixed by the extension member, and the side wall and the extension member are integrated with each other.

* * * * *